United States Patent

Yang

[11] Patent Number: 5,810,275
[45] Date of Patent: Sep. 22, 1998

[54] REEL TABLE DRIVING DEVICE FOR A VIDEO CASSETTE RECORDER

[75] Inventor: Chong-Tae Yang, Seoul, Rep. of Korea

[73] Assignee: Daewoo Electronics Co., Ltd., Seoul, Rep. of Korea

[21] Appl. No.: 898,026

[22] Filed: Jul. 21, 1997

[30] Foreign Application Priority Data

Jul. 31, 1996 [KR]   Rep. of Korea ................... 1996-31773

[51] Int. Cl.$^6$ ......................... G11B 23/107; G11B 5/008
[52] U.S. Cl. ....................................... 242/356.5; 360/96.3
[58] Field of Search ......................... 242/356.5; 360/96.3

[56] References Cited

U.S. PATENT DOCUMENTS

| 4,711,410 | 12/1987 | Gwon | 242/356.5 |
| 5,573,197 | 11/1996 | Choi | 242/356.6 |

FOREIGN PATENT DOCUMENTS 0479484   4/1992   European Pat. Off. .

Primary Examiner—John Q. Nguyen
Attorney, Agent, or Firm—Anderson, Kill & Olick, P.C.

[57] ABSTRACT

A reel table driving device, for a video cassette recorder, comprises a pulley, a driving gear rotated with the pulley, and a first and a second idle gears rotatably fitted on a post fixed to a bracket pivotably mounted to the deck. The first and the idle gears are frictionally coupled to each other through a friction member. The pulley is provided with a boss tightly fitted on a shaft rotatably held by the deck, the boss having a pair of opposite guide groove axially extending. The driving gear has a pair of protrusions inwardly protruding from an inner surface thereof and is fitted onto the boss of the pulley in such a manner that the protrusions are inserted in the respective guide grooves. The driving gear is movable up and down along the guide grooves and rotated together with the pulley by the interaction of the protrusion and the guide groove. A compressive spring is disposed between the driving gear and the pulley, biasing the driving gear upwardly to thereby allow the driving gear to be engaged with the first idle gear during a fast forward or rewind mode, and a pressing member presses the driving gear downwardly against the compressive spring to thereby allow the driving gear to be engaged with the second idle gear during a play mode.

4 Claims, 3 Drawing Sheets

REEL TABLE DRIVING DEVICE FOR A VIDEO CASSETTE RECORDER

FIELD OF THE INVENTION

The present invention relates to a reel table driving device for a video cassette recorder ("VCR"); and, more particularly, to a reel table driving device with a simplified structure.

DESCRIPTION OF THE PRIOR ART

As shown in FIG. 1, a VCR includes a supply reel table 10 and a take-up reel table 12. The rotating torque of each reel table 10, 12 be varied to allow the VCR to be operable in various modes, e.g., play, rewind and fast forward modes. The switching of the operation mode is executed by a reel table driving device 20 which is disposed between the supply reel table 10 and the take-up reel table 12 and selectively driving one of them.

There is shown in FIG. 2 a conventional reel table driving device disclosed in U.S. Pat. No. 5,573,197. The reel table driving device includes a driving pulley 50, a driving gear 52, a clutch wheel 54 movably disposed between the pulley 50 and the driving gear 52, and a variable torque generating means comprised of a cylindrical holder 74 and a first and a second one-way clutch springs 78, 80. An idler 90, rotatably held by a bracket 91 pivoted to a deck (not shown), is engaged with the driving gear 52. The idler 90 is shifted clockwise and counterclockwise to transmit selectively the driving force of the driving gear 52 to a supply or take-up reel table, thereby enabling the VCR to operate in a certain selected mode.

However, in such a conventional reel table driving device, since there are a large number of components, it is difficult to assemble them together, thereby resulting in a poor productivity thereof.

SUMMARY OF THE INVENTION

It is, therefore, a primary object of the invention to provide a reel table driving device with a simplified structure, thereby increasing the productivity thereof.

In accordance with one aspect of the present invention, there is provided a reel table driving device for a video cassette recorder with a deck, which comprises: a pulley rotatably held by the deck; a driving gear rotated with the pulley, the driving gear being movable up and down; a first and a second idle gears rotatably fitted on a post fixed to a bracket pivotably mounted to the deck, the first and the idle gears being frictionally coupled to each other through a friction member; and means for moving the driving gear up and down to be selectively engaged with the first or second idle gear depending on an operation mode of the VCR.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 3:
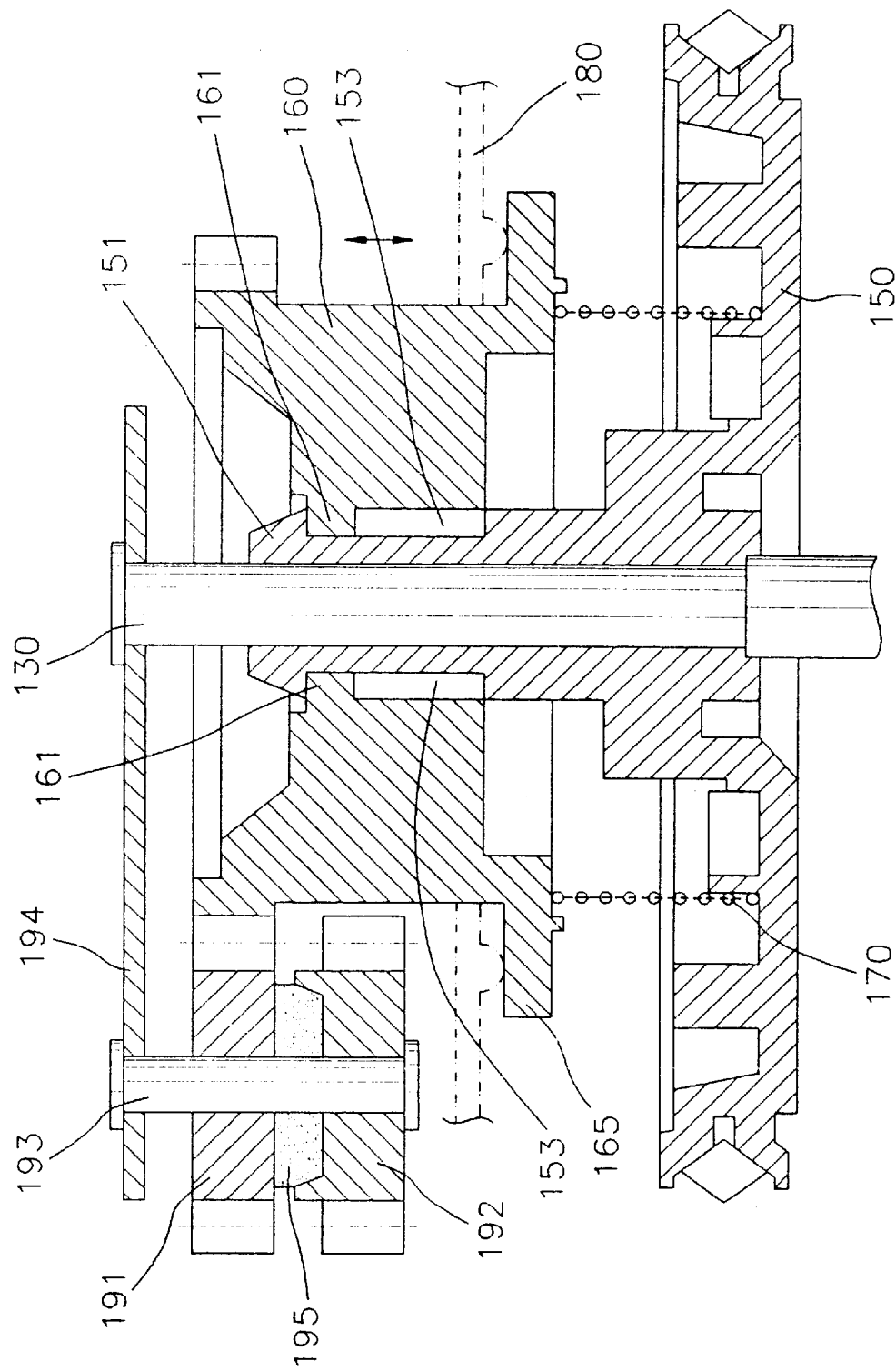
FIG. 3 depicts a cross sectional view of a reel table driving device in accordance with a preferred embodiment of the present invention.

There is shown in FIG. 3 a cross sectional view of a reel table driving device for a VCR in accordance with a preferred embodiment of the present invention. The reel table driving device of the present invention comprises a pulley 150, a driving gear 160 and a first and a second idle gears 191, 192. The pulley 150 is provided with a boss 151 tightly fitted on a shaft 130 rotatably held by a deck (not shown). The boss 151 of the pulley 150 has a pair of opposite guide grooves 153 axially extending.

The driving gear 160 has a pair of opposite protrusions 161 formed on an inner surface thereof. The driving gear 160 is fitted on the boss 151 of the pulley 150 in such a manner that the protrusions 161 are inserted in the respective guide grooves 153. The driving gear 160 is movable up and down along the guide grooves 153 and rotated together with the pulley 150 by the protrusions 161 interacting with the guide grooves 153.

The first and the second idle gears 191, 192, disposed adjacent to the driving gear 160, are rotatably fitted on a post 193 fixed to a bracket 194 pivotably mounted to the deck. The first and the second idle gears 191, 192 are frictionally coupled to each other through a friction member 195 such as a felt, viscous fluid, etc.

A compressive spring 170 is disposed between the driving gear 160 and the pulley 150, biasing the driving gear 160 upwardly to thereby allow the driving gear 160 to be engaged with the first idle gear 191 during a fast forward or rewind mode of the VCR. A pressing member 180 is disposed on a flange 165 of the driving gear 160 and presses the driving gear 160 downwardly against the compressive spring 170 to allow the driving gear 160 to be engaged with the second idle gear 192 during a play mode.

Figure 1:
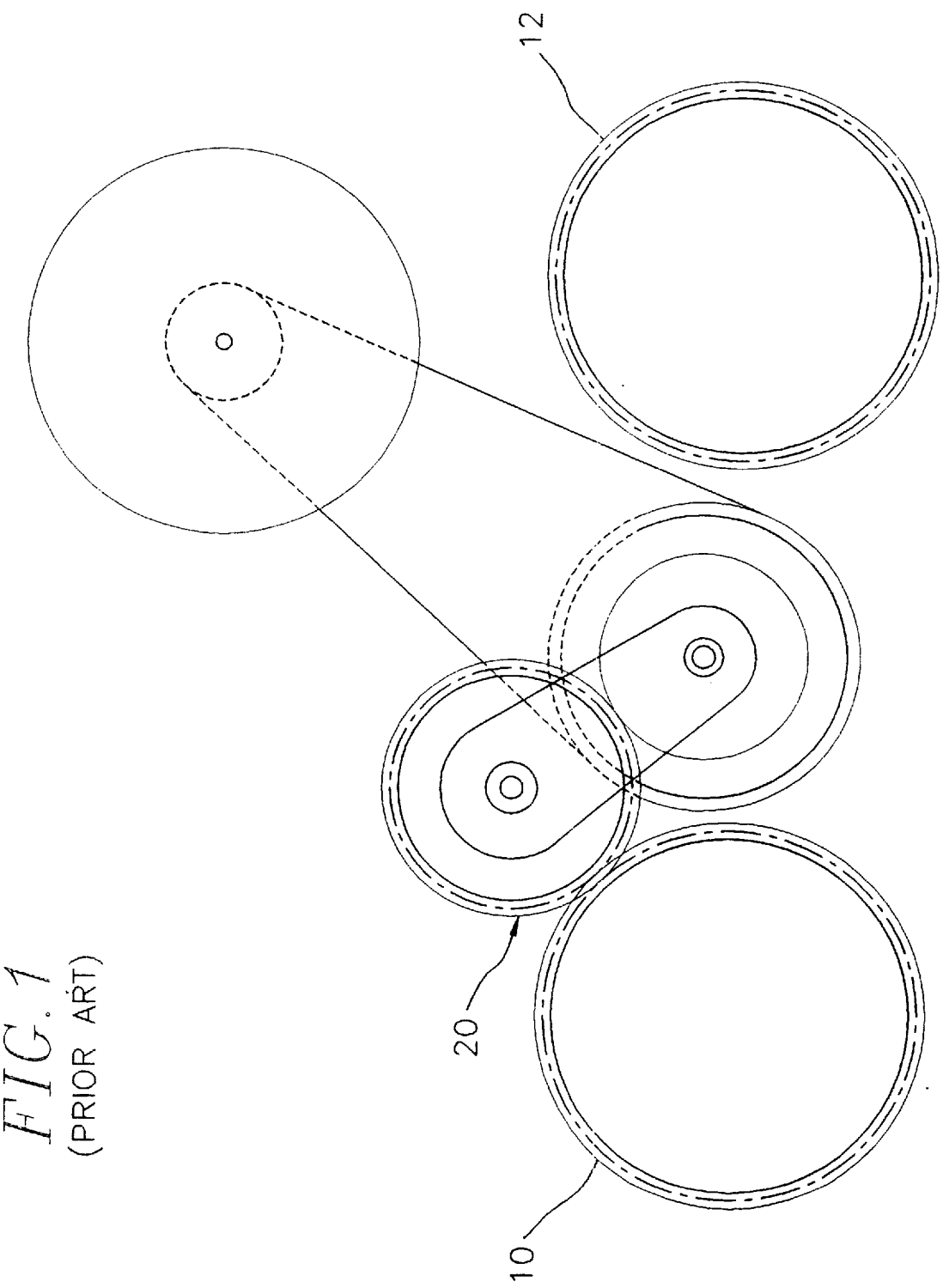
FIG. 1 is a schematic top view of a VCR, showing a typical reel table driving system.
Figure 2:
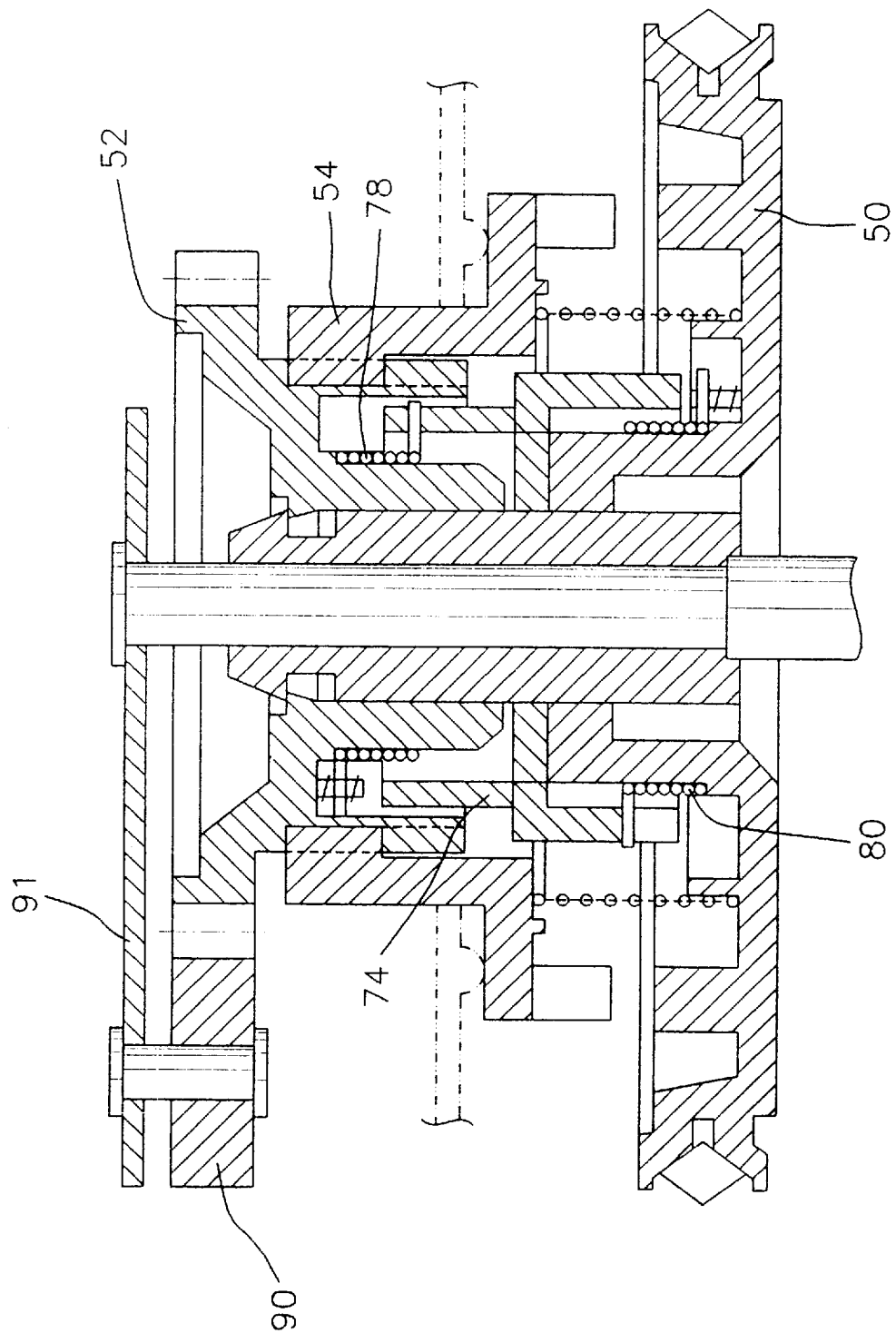
FIG. 2 presents a cross sectional view of a prior art reel table driving device.

The operation of the reel table driving device of the present invention will now be described with reference to FIGS. 1 and 3.

In case of the play mode, the pulley 150 is rotated clockwise and the first idle gear 191 is engaged with a take-up reel table 12. At the same time, the driving gear 160 is moved down by the downward movement of the pressing member 180 to be engaged with the second idle gear 192, and thus the driving force of the driving gear 160 is transmitted to the take-up reel table 12 though, in turn, the second idle gear 192, the friction member 195 and the first idle gear 191. When the load exerted to the take-up reel table 12 exceeds a predetermined value, there occurs a slip between the first and the second idle gears 191, 192 and the torque transmitted to the take-up reel table 12 is gradually reduced as the load or the tape wound around the take-up reel table 12 is increased, thereby keeping the tape running speed constant.

On the other hand, in the fast forward or rewind mode, the pressing member 180 is released from the driving gear 160 and then the driving gear 160 is moved up by the biasing force of the compressive spring 170 to be engaged with the first idle gear 191. As a result, the driving force of the driving gear 160 is directly transmitted to the take-up reel table 12 or a supply reel table 10 through the first idle gear 191, and the torque transmitted to the reel table is kept constant.

According to the reel table driving device of the present invention, the structure for varying the torque transmitted to each reel table depending on the operation mode is simpler than in the prior art device, thereby resulting in an increased productivity thereof.

Although the invention has been shown and described with respect to the preferred embodiments, it will be understood by those skilled in the art that various changes and modifications may be made without departing from the spirit and scope of the invention as defined in the following claims.

What is claimed is:

1. A reel table driving device for a video cassette recorder (VCR) with a deck, which comprises:

a pulley rotatably held by the deck;

a movably mounted driving gear rotating integrally with the pulley, the driving gear being movable up and down;

a first and a second idle gears rotatably fitted on a post fixed to a bracket pivotably mounted to the deck, the first idle gear being mounted axially above the second idle gear, the first and the idle gears being frictionally coupled to each other through a friction member; and means for moving the driving gear up and down to be selectively engaged with the first or second idle gear depending on an operation mode of the VCR.

2. The device of claim 1, wherein the pulley is provided with a boss tightly fitted on a shaft rotatably held by the deck, the boss having at least one guide groove axially extending; the driving gear has at least one protrusion inwardly protruding from an inner surface thereof, the driving gear being fitted on the boss of the pulley in such a manner that the protrusion is inserted in the guide groove, the driving gear being movable up and down along the guide groove and rotated together with the pulley by the protrusion interacting with the guide groove.

3. The device of claim 2, wherein the driving gear up and down moving means includes:

a compressive spring disposed between and in contact with the driving gear and the pulley, the compressive spring biasing the driving gear upwardly to thereby allow the driving gear to be engaged with the first idle gear; and a pressing member pressing the driving gear downwardly against the compressive spring to thereby allow the driving gear to be engaged with the second idle gear.

4. The device of claim 1, wherein the driving gear up and down moving means includes:

a compressive spring disposed between and in contact with the driving gear and the pulley, the compressive spring biasing the driving gear upwardly to thereby allow the driving gear to be engaged with the first idle gear; and a pressing member pressing the driving gear downwardly against the compressive spring to thereby allow the driving gear to be engaged with the second idle gear.

* * * * *

UNITED STATES PATENT AND TRADEMARK OFFICE

CERTIFICATE OF CORRECTION

PATENT NO.    : 5,810,275
DATED         : September 22, 1998
INVENTOR(S)   : Chong-Tae Yang It is certified that error appears in the above-identified patent and that said Letters Patent is hereby corrected as shown below:

On the title page, item
[30] Foreign Application Priority Data

Jul. 31, 1996   [KR]   Rep. of Korea        96-31773

Signed and Sealed this

Fifteenth Day of December, 1998

Attest:

Attesting Officer

BRUCE LEHMAN

Commissioner of Patents and Trademarks